CHRISTIANUS W. J. VAN KOPPEN
AND FREERK J. FONTEIN

BY: Cushman, Darby & Cushman
ATTORNEYS

United States Patent Office 3,147,212
Patented Sept. 1, 1964

3,147,212
PROCESS AND APPARATUS FOR RINSING FINE PARTICLES COVERED WITH A SUSPENSION
Christianus W. J. Van Koppen, Sittard, and Freerk J. Fontein, Heerlen, Netherlands, assignors to Stamicarbon N.V., Heerlen, Netherlands
Filed July 27, 1961, Ser. No. 127,245
Claims priority, application Netherlands July 30, 1960
14 Claims. (Cl. 209—17)

This invention relates to a new and improved process and apparatus for rising fine particles covered with suspension, wherein particles are passed over a screening deck in a layer having a thickness which is a multiple of the dimensions of the particles, while a rinsing liquid is sprayed over the full width of the layer.

The term "fine grained material" refers to material, at least part of which is so fine that it cannot, or can hardly be separated according to the specific gravity by means of a heavy medium by float-and-sink techniques. Such material can be separated by means of a centrifugal separating apparatus such as a hydrocyclone, the material generally having a grain size of 0–14 mm.

Fine grained material of this character is separated in coal and ore preparation plants in order to recover the separating medium which is adhered to the separated particles. Suspension which adheres to the surface of these separated particles is commonly rinsed off by a number of powerful water jets, wherein the diluted suspension is collected under the screens, the dilute suspension then being purified and thickened to the desired concentration by suitable regenerating means, and is then returned to the separation plant. Such a prior art separating operation dilutes the suspension adhering to the particles so that the content of the heavy medium solids in the liquid discharged with the separated particles corresponds to the content of heavy medium solids in the rinsing liquid which is discharged through the screen. Thus, if the amount of adhering heavy medium solids is to be reduced, considerable rinsing water is required which must be vigorously sprayed into the layer on the screening deck in various places to wet all the particles, the material consequently being intensely stirred up in each of these places. As a consequence of such prior art rinsing methods and means, the regenerating plant is necessarily quite large.

The amount of suspension which has adhered to the separated particles is proportionate to the surface area of the particles, and the amount of spraying water required is proportionate to the amount of suspension to be separated therefrom. Accordingly, the amount of separating water required to spray small particles is larger than the amount required to spray coarse particles. Because of this larger amount of suspension to be sprayed off, the screening area required to rinse and de-water fine particles is also larger than the area required to rinse coarse particles, and the capacity of the regeneration plant will have to be proportionately greater.

As an example of such prior art techniques for rinsing fine coal with a grain size of 0.5–8 mm. carried on vibrating screens, the amount of spraying water required per ton of product treated is 1.6–3 m.³ and the screening area of 0.1–0.2 m.² per ton per hour.

An object of this invention is to provide a novel and notably superior spraying process for particles of the character described wherein the rinsing water is scattered over the layer of particles in smoothly falling droplets or trickles, the force with which the droplets strike the bed of material being so small that the material is not, or hardly, stirred up or agitated.

According to this invention, the rinsing liquid is evenly distributed over at least a part of the screening deck in a manner such that substantially all of the upper surface of the layer is wetted by the spraying liquid. This liquid is discharged through the screen without forming a suspension bath on the screen, the force with which the liquid droplets strike the upper surface of the layer being so small that the upper part of the layer is not stirred up, or, at most, is stirred up only to a negligible extent.

A still further object of this invention is to provide a new and improved method and appartus for rinsing fine-grained particles covered with a suspension wherein the water consumption and the required screening area are considerably reduced. Thus, the water consumption may now be 0.6–1 m.³ per ton and the screening area 0.03–0.1 m.² per ton per hour. Such a notably superior result is achieved by virtue of the water being sprayed onto the layer so as to immediately sink through the layer, while entraining the suspension particles. This prevents a suspension bath from forming on the screen which would otherwise interfere with the structure of the layer. The notable results achieved by this invention are probably ascribed to the phenomenon that, when a particle to which suspension particles adhere is enveloped by a liquid film, this film sags in the shape of a drop, and all suspension particles are gathered in the lower part of this drop. As more liquid is sprayed, the lower part of the drop is released, this part entraining all the suspension particles. Accordingly, the suspension particles gradually sink to the lower part of the layer to be discharged in the end with the spraying liquid. Consequently, it is important that the structure and the grain size distribution of the layer should not, or at most, slightly, be changed.

Vertical movement of the particles with respect to each other ought to be avoided as much as possible. Nevertheless, the adherence of the particles in the layer should be periodically broken. This is effected by causing the bed of material to move along the screen over strips mounted transversely to the direction of this movement. These strips may, e.g., be 10–60 mm. in height and spaced at intervals of 20–60 cm. Alternatively or in addition the screen may define a stepwise descending path for the bed. A suitable height for the steps is 10–60 mm. Again, the vertical structure of the bed should be preserved without substantial change. With a stepped screening deck it is therefore preferable to provide an oblique or curved transition from one step to the next. The object of breaking down adhesion between particles being rinsed is to create the best possible opportunity for all suspension particles to sink down along the surface of each of the rinsed particles.

Still a further object of this invention relates to a coal or ore preparation plant which includes a washer for separating fine grained material according to specific gravity by means of a separating suspension together with screens for draining and spraying the separating suspension from the particles of material, the latter including at least one spraying apparatus which can produce spraying liquid over the full width of the screen, in the manner described.

A still further object of this invention relates to a spraying apparatus which includes a rectangular tank having a bottom wall mounted in a substantially horizontal plane over at least a part of the spraying screen, the bottom wall of the tank having a number of openings preferably arranged in rows perpendicular to the longitudinal axis of the screen, the holes being evenly distributed over the bottom wall of the tank. There is also provided supply means for introducing the spraying liquid into the tank and means for controlling and maintaining the liquid level within the tank. If the spraying liquid is pure water a large number of openings having a small diameter are entirely adequate; however, where clarified water is used as the spray liquid, e.g., water originating from the over-flowing fraction of a thickener, these openings may become clogged. In order to obviate such clogging, means are provided under the openings to deform the jet of liquid flowing through the opening into a liquid film, this film being divided into a number of parallel and substantially equal strips of liquid.

Accordingly, this invention has further reference to a rectangular spraying tank having a plurality of holes in the bottom wall, and carried therebelow are a number of parallel plates arranged at an angle to the bottom wall of the tank. Each plate includes a flat section disposed under at least one opening of each of the rows of holes and a corrugated section adjacent to the flat section of the plate. The corrugated section preferably comprises equal, trough-shaped elements, each of which is formed by the intersection of two plates positioned at an angle to one another, the ridges of the adjacent, trough-shaped elements adjoining the flat section thereof. By virtue of this arrangement, a small number of openings may be provided in the bottom wall of the tank, each opening having a relatively large diameter so that clogging of the openings is prevented. The spraying device need not extend over the full length of the screen as the effective length of the spraying device need only be adequately large to ensure that virtually all the suspension particles are removed from the bottom part of the layer of fine-grained material.

These and still further objects, advantages, and novel features of the present invention will become evident in the specification and claims, taken with the accompanying drawings.

According to this invention, a spraying apparatus extends continuously over at least part of the length of a spraying screen, and is constructed and arranged with respect to the screen so that the rinsing water is substantially evenly distributed over the surface of the portion of the screen beneath the spraying apparatus, and in an amount such that the liquid can be discharged through the screen without forming a suspension bath on the screen. The water flowing on the layer of particles to be rinsed strikes the material at a velocity so low that the upper part of the layer is stirred up at most to only a negligible extent.

Figure 1:
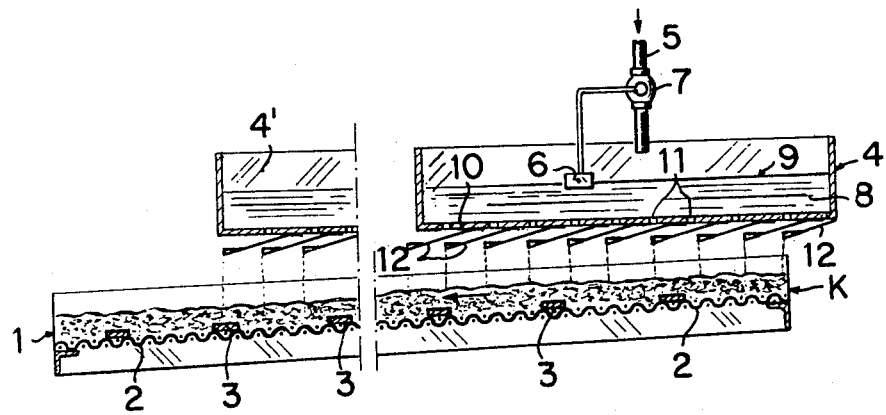
FIGURE 1 is a diagrammatic elevation view of a spraying apparatus according to this invention.

Referring now to the drawings, there is shown in FIGURE 1 a vibrating screen 1 having a screening deck 2 having small openings therethrough. The vibrating screen 1 may be operated by any drive mechanism (not shown) and the longitudinal stroke is preferably 10–30 mm. at a frequency of 800–1000 vibrations per minute; and, the screening deck 2 is inclined at a small angle to the horizontal. Mounted on the screening deck 2 in transverse relationship to the longitudinal axis thereof are transversely extending strips 3 having a height of 10–60 mm. and a center-to-center distance of 20–60 cm. The layer of fine grained material is fed on the screening deck 2 in the direction indicated by the arrow K, the layer having a thickness of, e.g., 20 cm.

Mounted at a distance of, e.g., 50 cm. over the screening deck 2 is a rectangular tank 4. A water supply pipe 5 discharges spraying liquid into the tank 4, the pipe 5 having a valve 7 therein which is controlled by a float 6 disposed on the surface of the liquid 8 in the tank 4. By virtue of the float 6, the level of the spraying water 8 in the tank can thereby be adjusted to a predetermined level 9. The tank 4 has a bottom wall 10 disposed in a generally horizontal plane, the wall 10 having holes 11 arranged in parallel rows.

Figure 2:
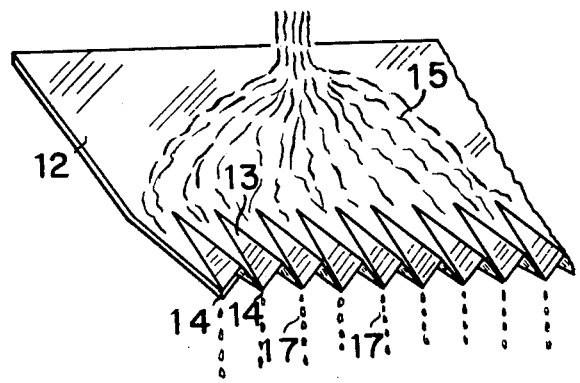
FIGURE 2 is a perspective view of a typical spraying plate in FIGURE 1.

Mounted in an angular relationship to the underside of the bottom wall 10 are parallel plates 12, which are so positioned that water flowing through the openings 11 flows in a jet onto the plates 12, and when striking the plates 12 the jet spreads onto the plate 12 in a film which flows downwardly over the surface thereof, as best shown in FIGURE 2.

The lower end of each spraying plate 12 is corrugated to provide a number of ridges 13, forming therebetween small triangular troughs terminating in their lower end at points or apices 14. Thus, a film 15 of the spraying liquid is separated into very thin trickles or drops 17 as the liquid leaves the bottom end points 14 of the plates 12.

By virtue of this arrangement, the openings 11 are of a rather large diameter such as 10–12 mm., so they will not become clogged by solid particles in the spraying water. Likewise, the distance between the openings 11 transverse to the direction of flow of the material may be correspondingly large.

As the spraying water leaves the spraying apparatus in drops or very thin trickles 17, the rate of fall is low and there is no danger of the material being stirred up.

The points or apices 14 of the plate 12 may be consecutively staggered as viewed in the direction of travel of the material so as to enhance to an even greater degree the distribution of the spraying liquid.

Figure 3:
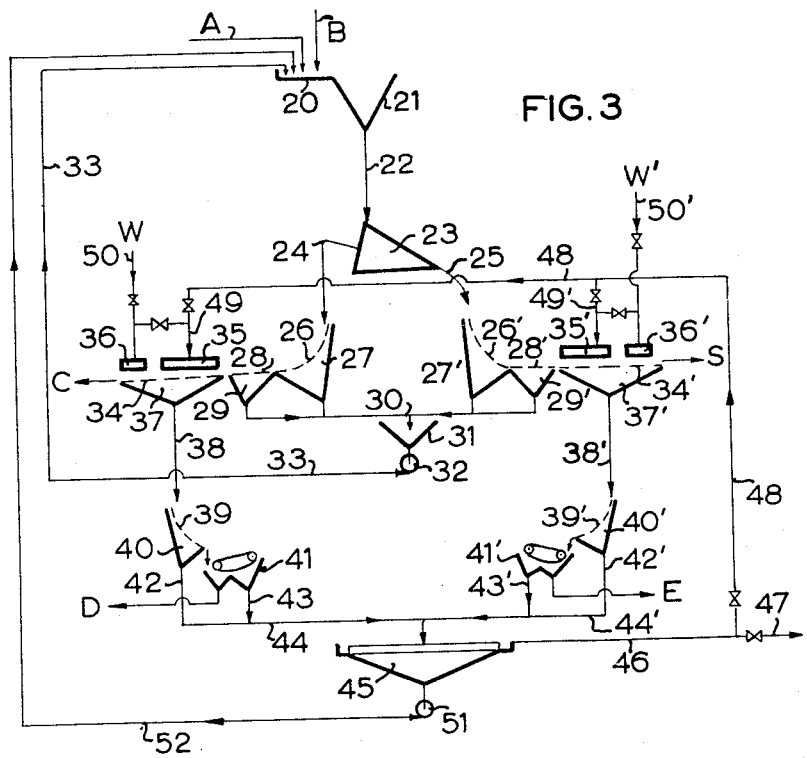
FIGURE 3 is a flow diagram of a cyclone washer provided with spraying screens according to this invention.

Referring now to FIGURE 3, a flow diagram of a coal preparation plant is shown wherein the separating device is a hydrocyclone, the plant utilizing the spraying method and apparatus according to this invention. A supply trough 20 of a mixing tank 21 receives raw coal having a size of 1–10 mm. at A, and also receives a magnetite suspension at B. The mixture flows through a downcomer 22 to a cyclone washer 23 in which there is a separation into the coal fraction and the shale fraction, these fractions being discharged by conduits 24 and 25, respectively.

The coal fraction from the conduit 24 is fed tangentially onto a sieve bend 26, constructed according to the teaching of Fontein Patent No. 2,916,142, which teaching is included herein by reference. A separation is here provided into an overflow fraction and an underflow fraction, the greater part of the undiluted magnetite suspension together with very fine coal particles being separated in the underflow fraction and collected in a funnel 27. The overflow fraction from the sieve bond 26 flows onto a draining screen 28 having a collecting funnel 29 therebelow which receives another portion of the undiluted suspension. The magnetite suspension collected at the funnels 27 and 29 flows through a conduit 30 to a collecting tank 31, and is then returned to the supply trough 20 via a pump 32 and a conduit 33.

The overflow fraction from the draining screen 28 is supplied as a layer onto the spraying screen 34 which, like the draining screen 28 is a vibrating screen. A spraying apparatus 35, such as shown in detail in FIGURES 1 and 2, extends over part of the length of the screen 34, and has virtually the same width as the vibrating screen 34. The apparatus 35 is fed with spraying water supplied from a conduit 49.

As necssary, a shorter spraying apparatus 36 (shown in FIGURE 1 by numeral 4') extends over the terminal part of the vibrating screen 34, the spraying apparatus 36 receiving pure water W via a conduit 50. The coal, which is freed of suspension according to the teaching of this invention, is discharged at C. The diluted suspension is collected in a funnel 37 and fed tangentially onto a sieve bend 39 via a conduit 38, the sieve bend 39 likewise being constructed according to the teaching of the Fontein Patent No. 2,916,142.

The greater part of a dilute suspension, together with coal particles, forms the underflow fraction from the sieve bend 39, and is collected in a funnel 40. The overflow fraction which consists of the coarser coal particles and the remaining suspension is directed to a magnetic separator 41. The remainder of the magnetite is here separated out, after which it is passed through conduit 43, and together with the underflow from the sieve bond 39 which is discharged from the funnel 40, passes through conduit 42, through conduit 44, and to the thickener 45. The remaining coal particles are discharged from the magnetic separator 41 at D.

The overflow fraction from the thickener 45 is discharged through a conduit 46, and a part of this fraction is removed from the circuit through a conduit 47, as desired, to a flotation device (not shown). The remainder of this overflow fraction flows through a conduit 48 to the spraying apparatus 35. The thickened magnetite is pumped via a pump 51 and through a conduit 52 to the supply trough 20.

The shale fraction discharged through the conduit 25 is treated in a manner identical to that described for the coal fraction, the similar elements being indicated by corresponding prime numerals.

The washed shale is discharged from the screen 34' at S, and the fine particles of the shale separated out by the magnetic separator 41' leave the circuit at E.

Inasmuch as considerably less spraying water is required with the spraying apparatus according to this invention, it is possible, under certain conditions, to effect the spraying exclusively with pure water so that the partial recirculation of the overflow fraction from the thickener 45 can be omitted.

Figure 4:
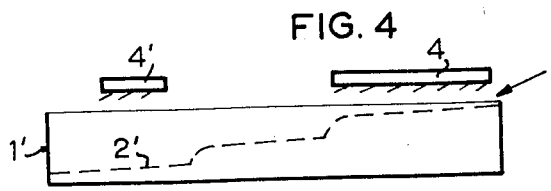
FIGURE 4 is a diagrammatic view of a stepped screening deck according to a modified embodiment of this invention.

In FIGURE 4, there is diagrammatically shown a vibrating screen 2' similar to that shown in FIGURE 1, and provided with a stepped deck, the successive steps being separated by oblique or curved transition planes.

Suitable modifications to the teaching of this invention may be made without departing from the spirit thereof. For instance, the ridges of the plates 12 may be formed by a zig-zag plate, the upper sides of the ridges being welded to the lower side of the plate 12. Also, the discharge end of the plate 12 may have a simple sawtooth edge.

From the foregoing description of the various embodiments of this invention, it is evident that the objects of this invention, together with many practical advantages are successfully achieved. While preferred embodiments of my invention have been described, numerous further modifications may be made without departing from the scope of this invention.

Therefore, it is to be understood that all matters herein set forth or shown in the accompanying drawings are to be interpreted in an illustrative and not in a limiting sense.

What is claimed is:

1. Process for rinsing fine particles covered with a suspension comprising the steps of: passing the particles in layer formation over a screen, the layer thickness being a multiple of the particle dimensions; and spreading a rinsing liquid out in a film and separating the film into drops; depositing these drops over the full width of the layer in an amount sufficient to wet substantially all the upper surface of the layer; the liquid drops striking the upper surface of the layer with a sufficiently small force to provide, at maximum, a negligible stirring thereof, and discharging the liquid through the screen without forming a suspension bath thereon.

2. Process defined in claim 1 including the step of vibrating said screen.

3. Process defined in claim 2 including the step of vibrating said screen with a stroke length of 10–30 mm. at a frequency of 800–1000 vibrations per minute.

4. Process defined in claim 1 wherein said suspension comprises a magnetic heavy media.

5. Process defined in claim 1 including the step of periodically breaking the adhesion of the particles in the layer by passing the layer over steps on the screen deck situated in transverse relationship to the layer path, which steps have a maximum height of 60 mm.

6. Apparatus for spraying fine particles covered with a suspension comprising: a screening deck for receiving the particles in layer form; a tank having a substantially horizontal bottom wall mounted over said screening deck, and said tank bottom wall having a number of evenly distributed openings therethrough; means for supplying the spraying liquid to said tank; means for controlling and maintaining the liquid level in said tank; and means positioned below said tank bottom wall for changing the jet of liquid flowing through each opening into a film and dividing the film into a number of generally parallel and substantially equal strips of liquid.

7. Apparatus defined in claim 6 wherein said openings are arranged in rows perpendicular to the longitudinal axis of the screen, said means positioned below said tank bottom wall comprising a number of generally parallel plates mounted at an angle to said bottom wall, each plate including a flat section mounted below at least one opening of each of said rows, and a corrugated section adjacent to said flat section.

8. Apparatus defined in claim 7 wherein said corrugated section includes similar trough-shaped elements, each of which includes two angularly intersecting plates to define ridges, said ridges intersecting said flat section.

9. Preparation plant for coal, ore and the like, comprising: washer means for separating fine grained materials, according to the specific gravity by a separating suspension; draining screen means for draining the separating suspension from particles of separated materials disposed thereon in layer formation; rinsing screen means for rinsing the separating suspension from said particles; means disposed over said rinsing screen means to distribute spraying liquid over the full width of said rinsing screen means in such an amount that this liquid can be discharged through the rinsing screen means without forming a suspension bath thereon and the water flowing on the material to be rinsed strikes the material at such a low velocity that the upper surface of the layer is stirred up, at a maximum, to a negligible extent, said means including: tank means; plate means positioned in communication with said tank means in inclined relationship above said rinsing screen means, said plate means including a first portion for spreading rinsing liquid received from said tank means in a liquid film and means downstream of said first portion for dividing said liquid film into drops which drops constitute said spraying liquid.

10. Preparation plant defined in claim 9 including means for imparting a vibratory motion to said screen means.

11. Preparation plant defined in claim 9 including a plurality of members mounted to said screen means in transverse relationship to the longitudinal axis thereof.

12. Preparation plant defined in claim 11 wherein said members have a maximum height of 60 mm. and the center-to-center distances between adjacent members being 20–60 cm.

13. Preparation plant defined in claim 9 wherein said screen means are of stepped construction, the difference in height between successive steps being a maximum of 60 mm.

14. Preparation plant defined in claim 13 wherein said steps are connected by transition means.

References Cited in the file of this patent

UNITED STATES PATENTS

| 783,048 | Kidd | Feb. 21, 1905 |
| 2,267,327 | Ellen | Dec. 23, 1941 |
| 2,357,566 | Walter | Sept. 5, 1944 |
| 2,860,782 | Fontein | Nov. 18, 1958 |